US007161075B2

(12) United States Patent
Tamura

(10) Patent No.: US 7,161,075 B2
(45) Date of Patent: Jan. 9, 2007

(54) STRINGED MUSICAL INSTRUMENT HAVING STRINGS FOLDED OVER TAILPIECE

(75) Inventor: Shinya Tamura, Shizuoka-ken (JP)

(73) Assignee: Yamaha Corporation (JP)

( * ) Notice: Subject to any disclaimer, the term of this patent is extended or adjusted under 35 U.S.C. 154(b) by 211 days.

(21) Appl. No.: 10/949,319

(22) Filed: Sep. 27, 2004

(65) Prior Publication Data

US 2005/0098018 A1 May 12, 2005

(30) Foreign Application Priority Data

Nov. 11, 2003 (JP) ............................ 2003-380848

(51) Int. Cl.
*G01D 3/00* (2006.01)

(52) U.S. Cl. .......................................... 84/299; 84/302

(58) Field of Classification Search .................. 84/267, 84/297 R, 298–302, 307–309
See application file for complete search history.

(56) References Cited

U.S. PATENT DOCUMENTS 1,337,793 A * 4/1920 Poehland ..................... 84/302
2,714,326 A * 8/1955 McCarty ...................... 84/299
6,084,165 A * 7/2000 Chapman ..................... 84/291

* cited by examiner

*Primary Examiner*—Gary F. Paumen
(74) *Attorney, Agent, or Firm*—Dickstein, Shapiro, LLP.

(57) ABSTRACT

Strings are stretched between pegs and a tailpiece both forming parts of an electric base; the strings passes through the space between the body and the tailpiece, and are folded over the obverse surface of the tailpiece; although the body is shorter than that of a standard electric base, the decorative end portions, which are covered with colored yarns, do not reach a bridge, and are not bowed in performance; thus, the tailpiece makes it possible to use the short body without sacrifice of the tactile sense at the fingers in the bowing.

19 Claims, 10 Drawing Sheets

STRINGED MUSICAL INSTRUMENT HAVING STRINGS FOLDED OVER TAILPIECE

FIELD OF THE INVENTION

This invention relates to a stringed musical instrument and, more particularly, to a stringed musical instrument with strings stretched between pegs and a tailpiece.

DESCRIPTION OF THE RELATED ART

Music lovers are familiar with the violin family, i.e., the violin, viola, cello and double bass, and various improvements have been made in the violin family as disclosed in Japanese Patent Application laid-open No. 2000-259149. One of the improvements is to make the members of the violin family electrified. A pickup unit is mounted on the body, and converts the vibration energy to an electric signal for electrically producing the tones. Thus, new members such as electric bases join the violin family.

FIG. 1 shows a typical example of the electric base. In the following description, term "lower" is indicative of a position closer to the floor, on which the electric base stands, than a position modified with "upper". Term "reverse" is indicative of a position closer to a player, who holds the electric base for performance, than a position modified with "obverse".

The prior art electric base is broken down into a peg box 81, a body 82, a neck 82A, a fingerboard 82B, a bridge 83, a tailpiece 85 and an end pin 85A. The neck 82B projects from the upper end of the body 82, and the peg box 81 is secured to the upper end of the neck 82A. Two pairs of pegs 81*a* are provided on both side surfaces of the peg box 81, respectively, and shafts 81*b*, which are rotatably supported by the peg box 81, are driven for rotation by means of the pegs 81*a*. The end pin 85A projects from the lower end of the body 82, and is retractable into the body 82. While a player is performing a piece of music, the end pin 85A keeps the body 82 over the floor.

The fingerboard 82B is adhered to the front surface of the neck 82A, and overhangs the body 82. The tailpiece 85 is spaced from the lower area of the obverse surface 82C, and is anchored at the boss portion of the end pin 85A by means of a tail wire 86. The bridge 83 stands on the obverse surface 82C of the body 82 between the fingerboard 82B and the tailpiece 88, and is spaced from the obverse surface 82C by a distance longer than that between the lower end of the fingerboard 82B and the front surface 82C. The strings 80 have respective end portions 80A wound on the shafts 81*b* and respective other end portions 80B anchored at the tailpiece 88. Colored yarns are wound on respective parts of the end portions 80B, and the parts wound with the colored yarns are hereinafter referred to as "decorative parts". The pegs 81*a* give tension to the strings 80 so that the strings 80 are stretched between the shafts 81*b* and the tailpiece 88. When the strings 80 are properly stretched, the decorative parts are seen in the vicinity of the tailpiece 85, and do not reach the bridge 83.

Though not shown in FIG. 1, a pickup unit is embedded in the bridge 83, and converts the vibrations of the strings 80 to an electric signal. The electric signal is supplied through a sound system (not shown) to a speaker system (not shown), and is converted to electric tones through the loud speakers. The player bows and plucks the strings 80 between the bridge 83 and the fingerboard 82B in his or her performance, and presses the strings 80 to the fingerboard 82B with the fingers for changing the pitch of the electric tones.

The tailpiece 85 is so lengthy that the prior art electric base has a great length. The player feels the prior art electric base inconvenient to convey it from place to place. The problem is also encountered in the double bass. Although the violin and viola are not so large as the electric base, the tailpieces also make the violin and viola lengthy.

FIG. 2 shows another prior art electric base. The prior art base shown in FIG. 2 has a short body 82D. The other component parts are similar to those of the prior art base shown in FIG. 1, and, for this reason, are labeled with reference numerals designating the corresponding component parts of the prior art electric base shown in FIG. 1 without detailed description.

The short body 82D makes the prior art electric base compact, and the player feels the prior art electric base easy to convey. However, another problem is encountered in the prior art cello in the tones produced through the vibrations of the strings 80. This is because of the fact that the decorative parts 80E exceed the bridge 83. The decorative parts 80E are an obstacle against the vibrations of the strings 80, and make the tone color slightly different from that of the standard double base. A substantial amount of strings 80 is to be wound on the shafts 81*b*, and the player feels the tuning work troublesome.

FIG. 3 shows yet another prior art electric cello. Although the short body 82D is also used in the prior art electric base shown in FIG. 3, the tailpiece 85 is replaced with a saddle 88, and the strings 80 are anchored at the saddle 88. Since the saddle 88 is shorter than the tailpiece 85, the decorative parts 80E do not exceed the bridge 83, and allow the player to bow the strings 80 as similar to those of the prior art electric base shown in FIG. 1. However, the player feels the bowing unusual. The bowing gives rise to the vibrations of the strings 80, and the saddle 88 has influence on the vibrating strings 80 differently from the influence of the tailpiece 88. This results in curious tactile sense at his or her fingers.

As described hereinbefore, the countermeasures make the prior art electric bases compact at the sacrifice of the tone color or the player's feeling. In other words, the countermeasures can not satisfy the players.

SUMMARY OF THE INVENTION

It is therefore an important object of the present invention to provide a stringed musical instrument, which is compact without sacrifice of the tone color and player's tactile sense.

To accomplish the object, the present invention proposes to make strings folded in a tailpiece.

In accordance with one aspect of the present invention, there is provided a stringed musical instrument for producing tones comprising a body having one end portion and another end portion, a pitch controlling member having a longitudinal direction and projecting from the aforesaid one end portion in the longitudinal direction, a tension controlling unit secured to the pitch controlling member, a tailpiece connected to the aforesaid another end portion, and strings stretched in the longitudinal direction between the tension controlling unit and the tailpiece and folded in the tailpiece.

BRIEF DESCRIPTION OF THE DRAWINGS

The features and advantages of the stringed musical instrument will be more clearly understood from the following description taken in conjunction with the accompanying drawings, in which FIG. 10 is an end view showing an end surface of the tailpiece.

DESCRIPTION OF THE PREFERRED EMBODIMENTS

First Embodiment

Figure 1:
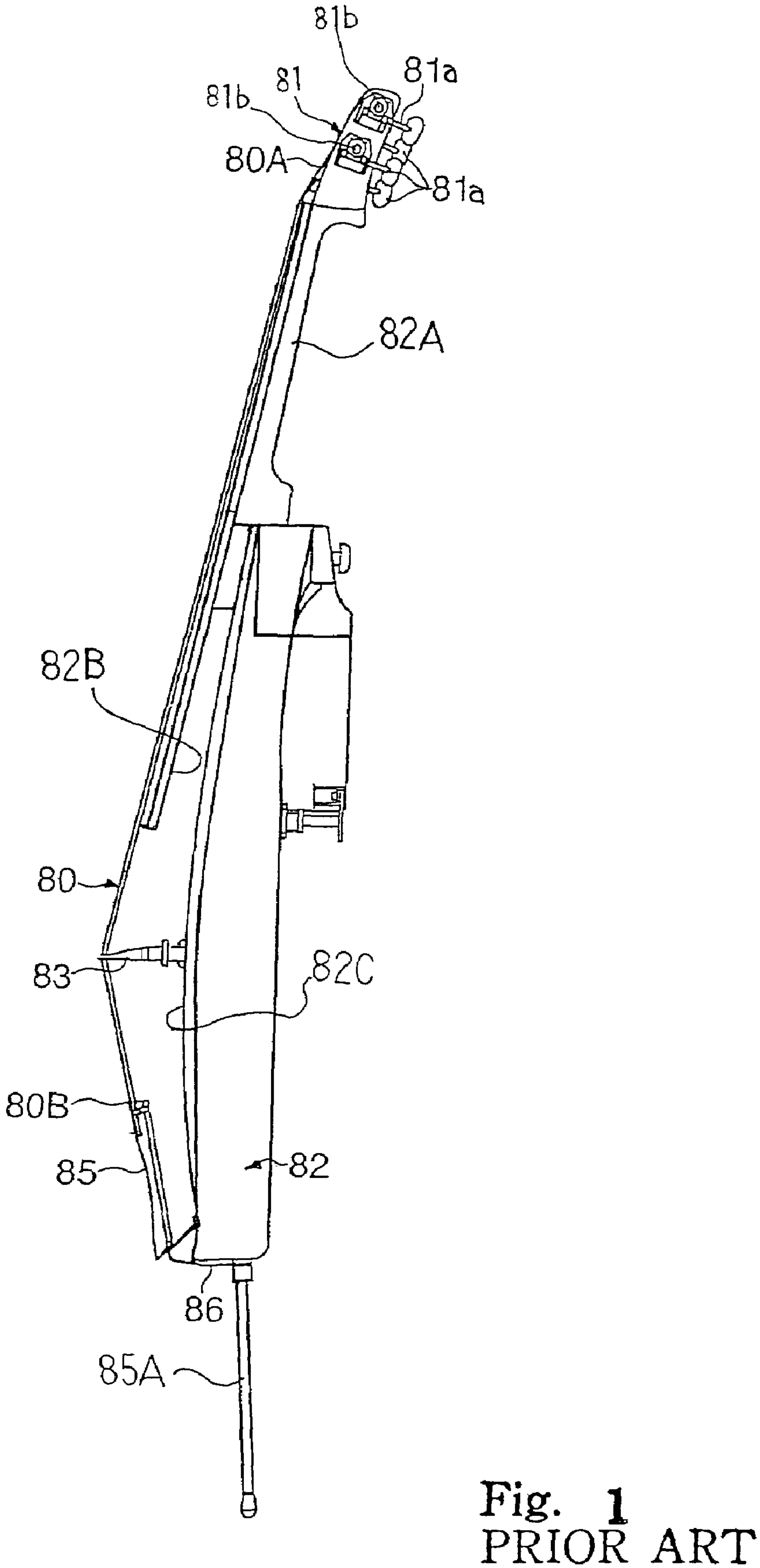
Fig. 1 PRIOR ART
FIG. 1 is a side view showing the structure of the prior art electric base.
Figure 2:
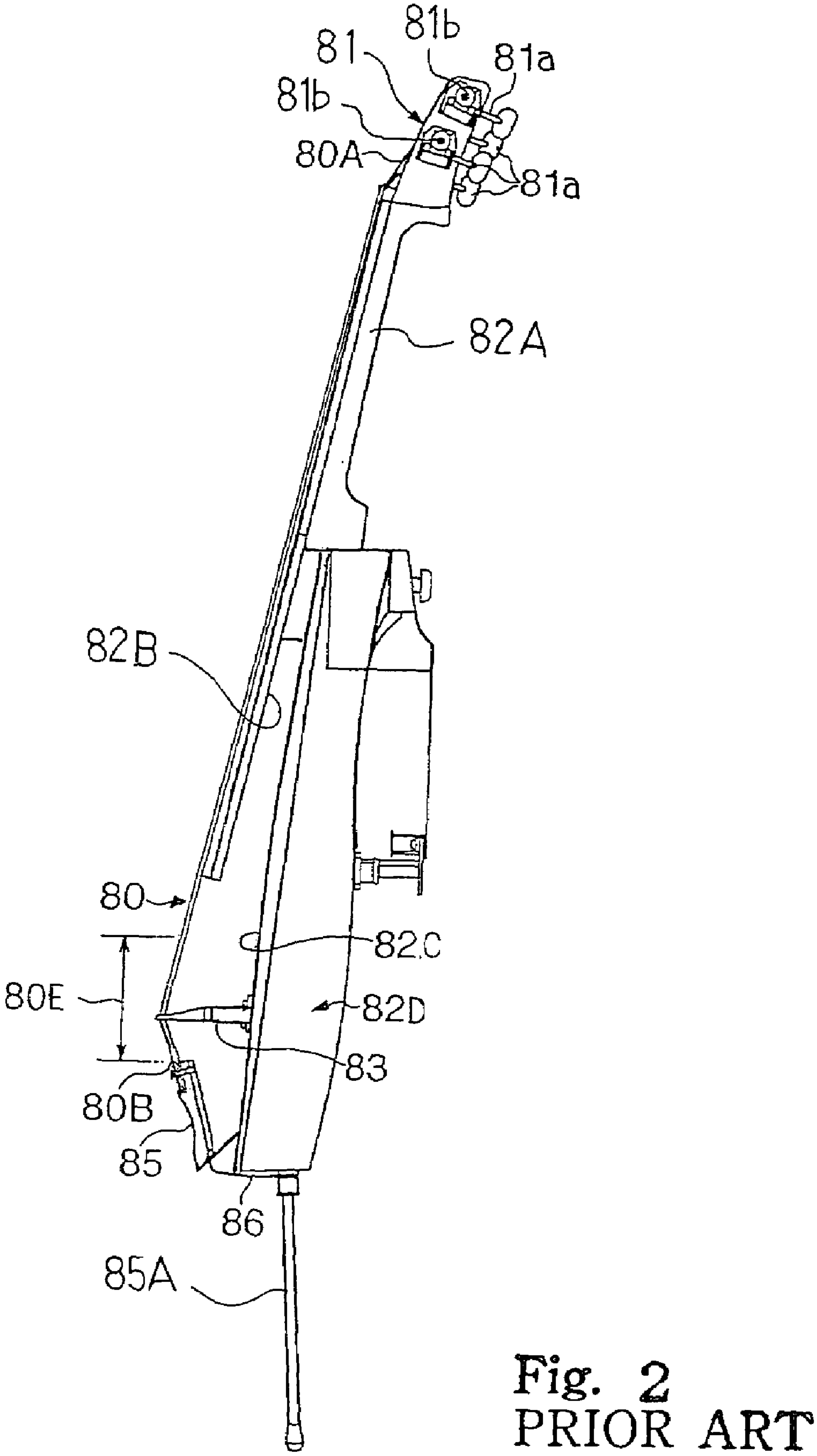
Fig. 2 PRIOR ART
FIG. 2 is a side view showing the structure of another prior art electric base.
Figure 4:
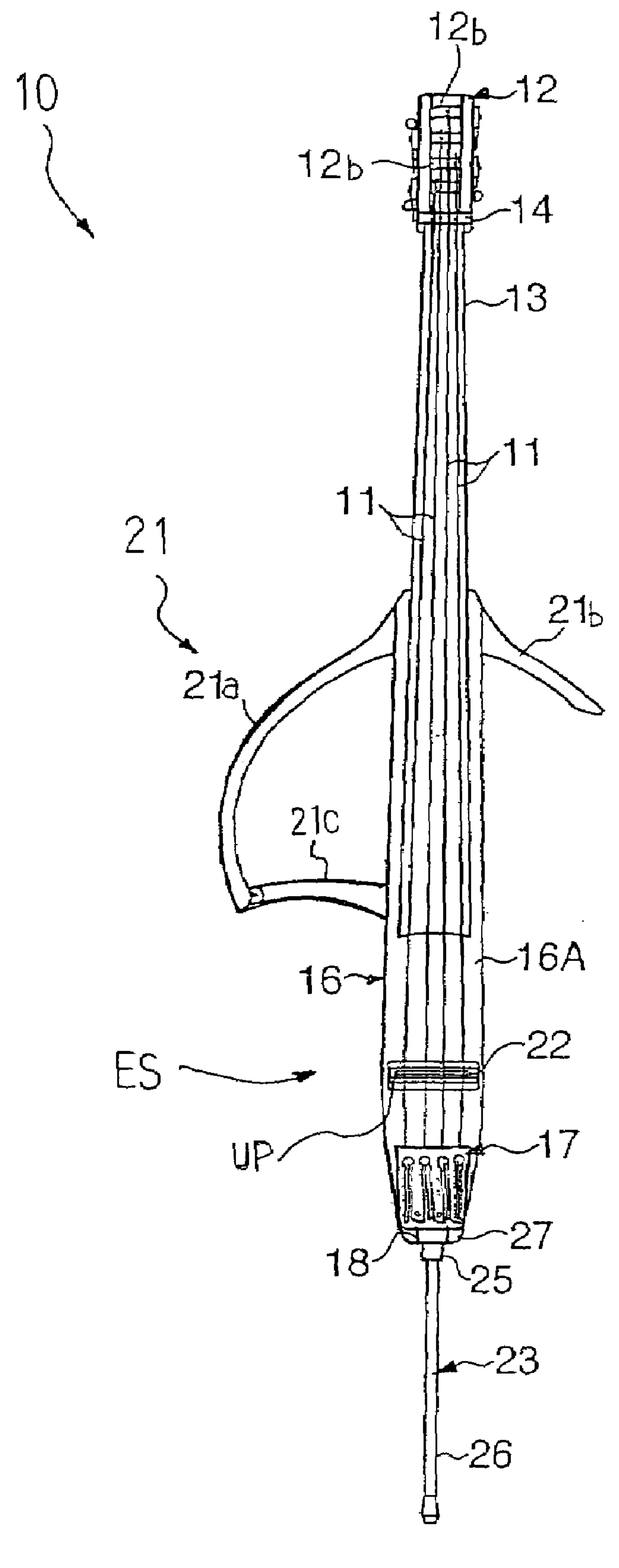
FIG. 4 is a front view showing the structure of an electric base according to the present invention.
Figure 5:
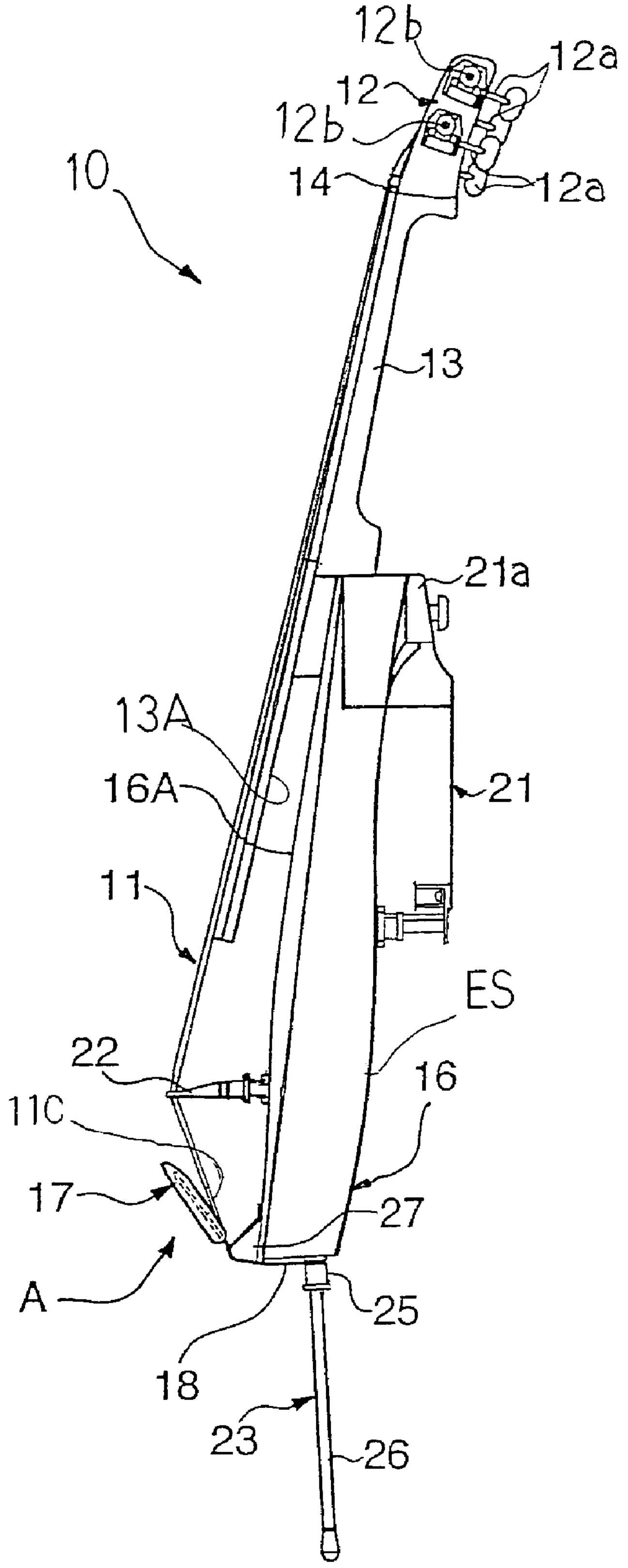
FIG. 5 is a side view showing the structure of the electric base.

Referring to FIGS. 4 and 5 of the drawings, an electric base embodying the present invention largely comprises a stringed instrument 10 and an electric system ES. Although the stringed instrument 10 is shorter than a standard electric base such as the prior art electric base shown in FIG. 1, and a player feels the bowing same as that on the prior art standard electric base. The electric system ES is installed in the stringed instrument 10 instead of a resonating chamber, and converts vibrations to an electric signal. The electric signal is supplied through a sound system (not shown) to a speaker system, (not shown). The electric signal is amplified and equalized in the sound system, and is converted to electric tones by means of the speaker system. The electric tones are close in timbre to the electric tones produced through the standard electric base.

The stringed instrument 10 includes strings 11, a peg box 12, a neck 13, a fingerboard 13A, a nut 14 and a body 16. The body 16 is different in shape from the body 82, and is like a rectangular pillar. The body 16 is shorter than the body 82. However, the peg box 12, neck 13 and fingerboard 13A are as long as those of the standard acoustic double bass. The neck 13 projects from the upper end of the body 16, and the peg box 12 is secured to the upper end of the neck 13. Two pairs of pegs 12*a* are provided on both side surfaces of the peg box 12, and shafts 12*b*, which are rotatably supported by the peg box 12, are bidirectionally driven for rotation by means of the pegs 12*a*. The fingerboard 13A is adhered to the obverse surface of the neck 13, and the nut 14 is secured to the upper end portion of the neck 13. The fingerboard 13A may be further bolted to the neck 13. Namely, the fingerboard 13A is secured to the neck 13. The fingerboard 13A downwardly extends over the lower end of the neck 13, and overhangs the obverse surface 16A of the body 16.

The stringed instrument further includes a tailpiece 17, a framework 21, a bridge 22, an end pin 23 and a saddle 27. The end pin 23 projects from the lower end of the body 16. The end pin 23 is constituted by a lock unit 25 and a pin 26. The lock unit 25 is secured to the lower end of the body 16, and the pin 26 slidably passes through the lock unit 25. The pin 26 is slidable into and out of the body 16 through the lock unit 25. When the lock unit 25 is made tightened, the pin 26 is fixed to the lock unit 25, and keeps the body 16 over the floor.

Figure 3:
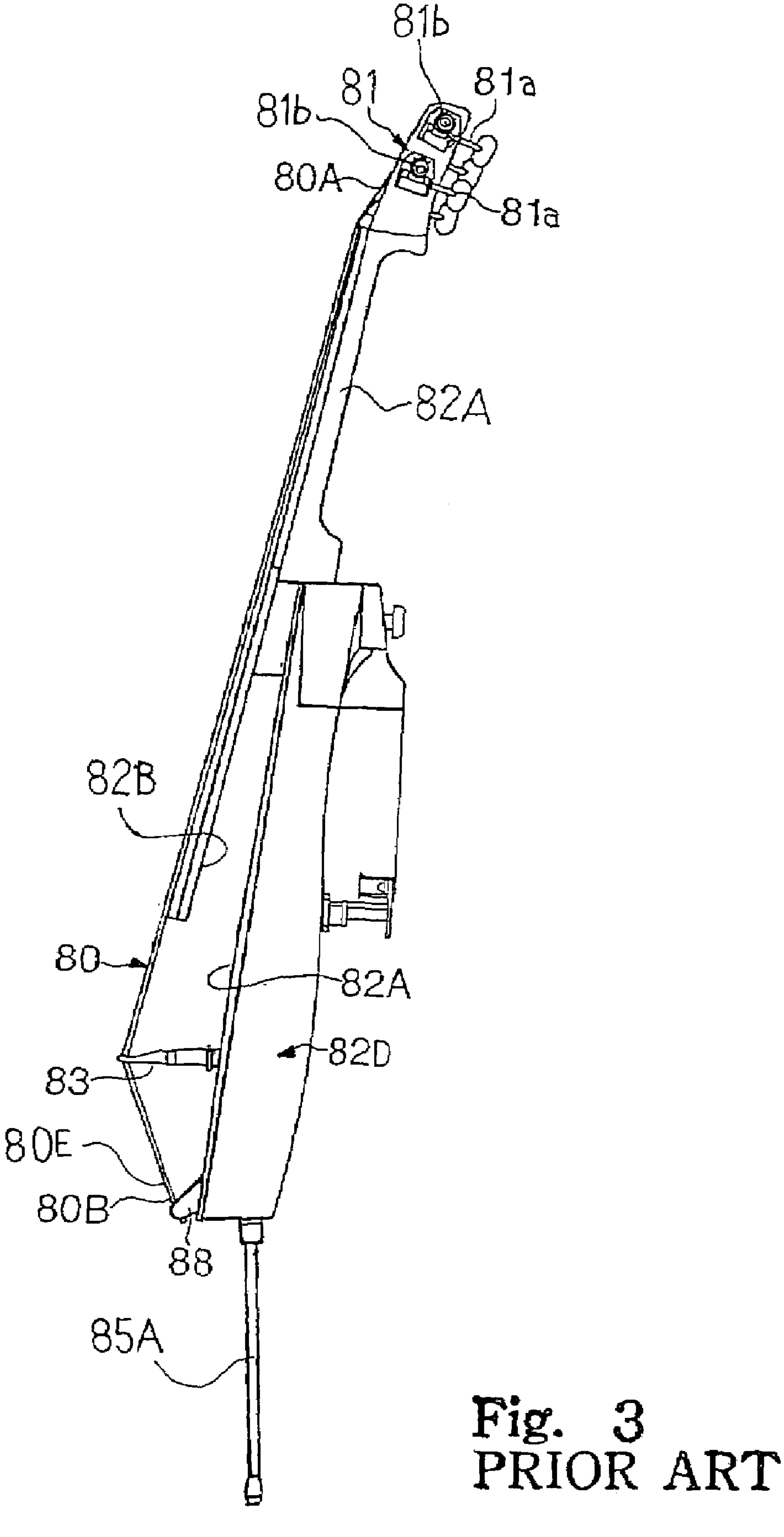
Fig. 3 PRIOR ART
FIG. 3 is a side view showing the structure of yet another prior art electric base.

The tailpiece 17 is shorter than the tailpiece 85. The tailpiece 17 is held over the obverse surface 16A, and is anchored at the lock unit 25 by means of a tail wire 18. The saddle 27 is secured to the lower end portion of the body 16, and guides the tail wire 18 from the lower end of the body 16 to the tailpiece 17. The bridge 22 is upright on the obverse surface 16*a* between the tailpiece 17 and the lower end of the fingerboard 13A, and has the top surface spaced from the observe surface 16A by a distance greater than that between the lower end of the fingerboard 13A and the obverse surface 16A. The strings 11 are wound on the shafts 12*b*, and are anchored at the tailpiece 17. The strings 11 are held in contact with the top surface of the bridge 22, and are folded in the tailpiece 17. Although the body 16 is shorter than the body 82, decorative parts 11*c*, which are the end portions of the strings 11 covered with colored yarns, do not reach the bridge 22. This means that a player does not bow the decorative parts 11*c*. For this reason, the player feels the bowing same as that on the strings of the standard electric base. The tailpiece 17 will be hereinlater described in more detail with reference to FIGS. 3A, 3B, and 3C.

The framework 21 includes three component parts 21*a*, 21*b* and 21*c*. The component part 21*b* is fixed to the body 16, and sideward projects from the body 16. The component part 21*b* has an outline same as the shoulder portion of the body 82. On the other hand, the component part 21*a* is rotatably connected at one end to the body 16 and at the other end thereof to the component part 21*c*, and the other component part 21*c* is rotatably connected at the other end to the body 16. The outline of the component part 21*a* is same as the other shoulder portion of the body 82, and the component parts 21*a* and 21*c* are folded at the back of the body 16. When a player prepares the electric base for a performance, he or she stretches the component parts 21*a*/21*c* sideward, and the component parts 21*a*/21*b* are held in contact with the player's chest. Thus, the framework 21 makes the player imagine the electric base as an acoustic double bass.

The electric system ES includes a pickup unit UP embedded in the bridge 22, and the pickup unit UP converts the vibrations, which are propagated from the vibrating strings 11 to the bridge 22, to the electric signal. Though not shown in the drawings, the electric signal is output from a socket (not shown) embedded in the body 16 to the sound system (not shown). Thus, the electric tones are produced from the good vibrations of the strings 11, and have timbre close to that of the electric tones produced through the standard electric tones.

Figure 6:
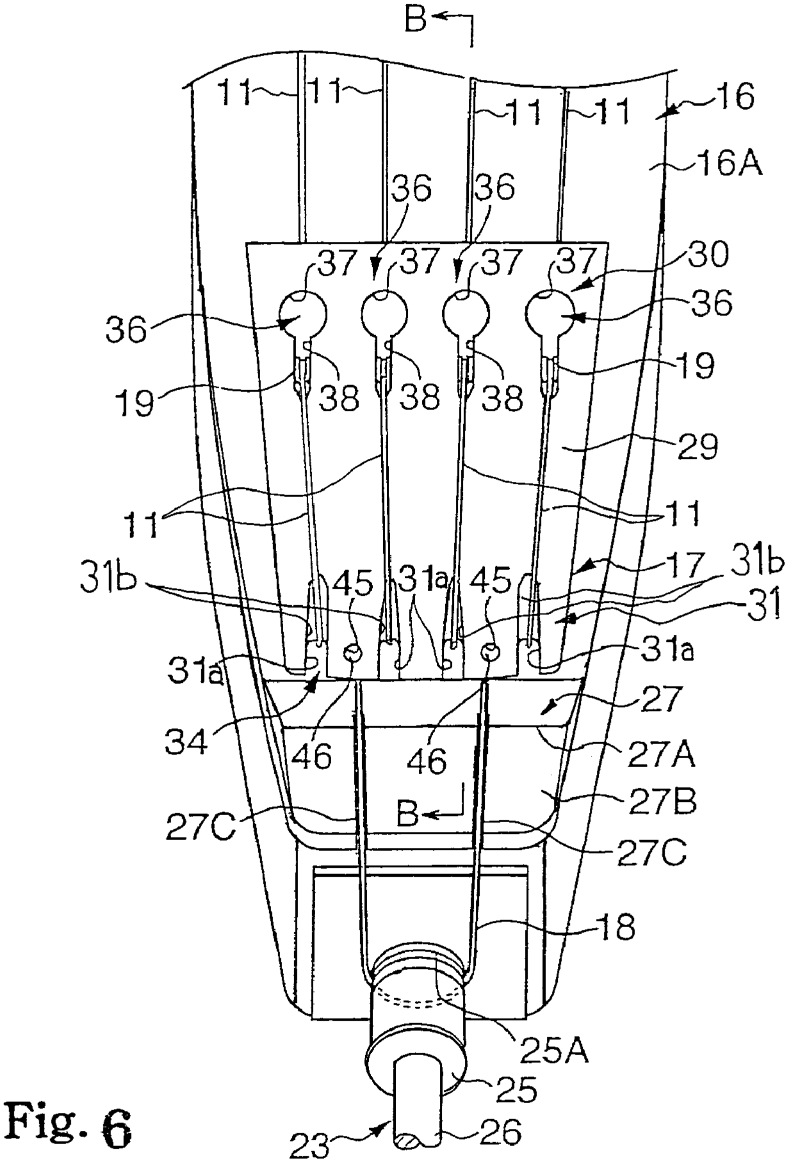
FIG. 6 is a perspective view showing the configuration of a tailpiece incorporated in the electric base.
Figure 7:
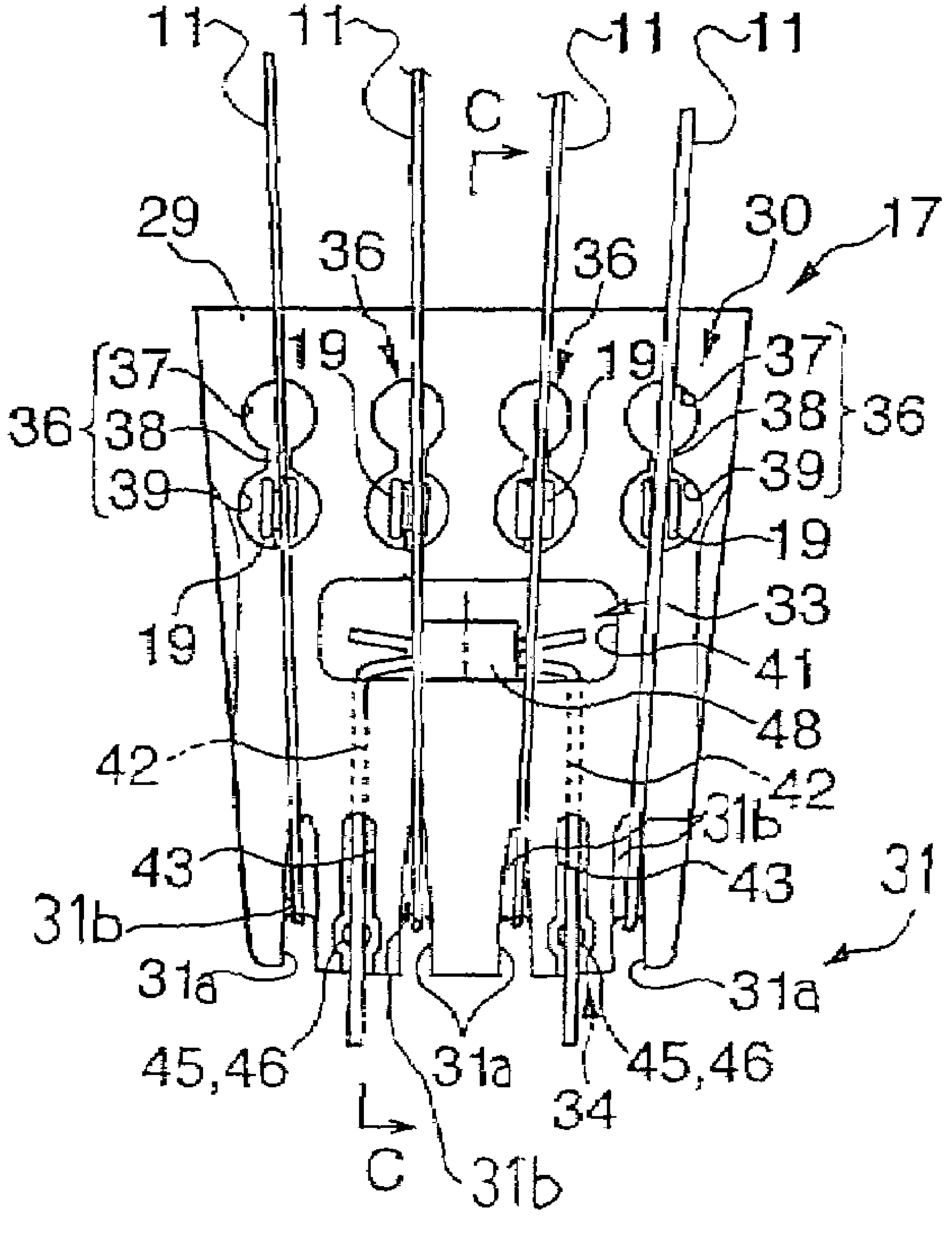
FIG. 7 is a rear view showing the configuration of the tailpiece.
Figure 8:
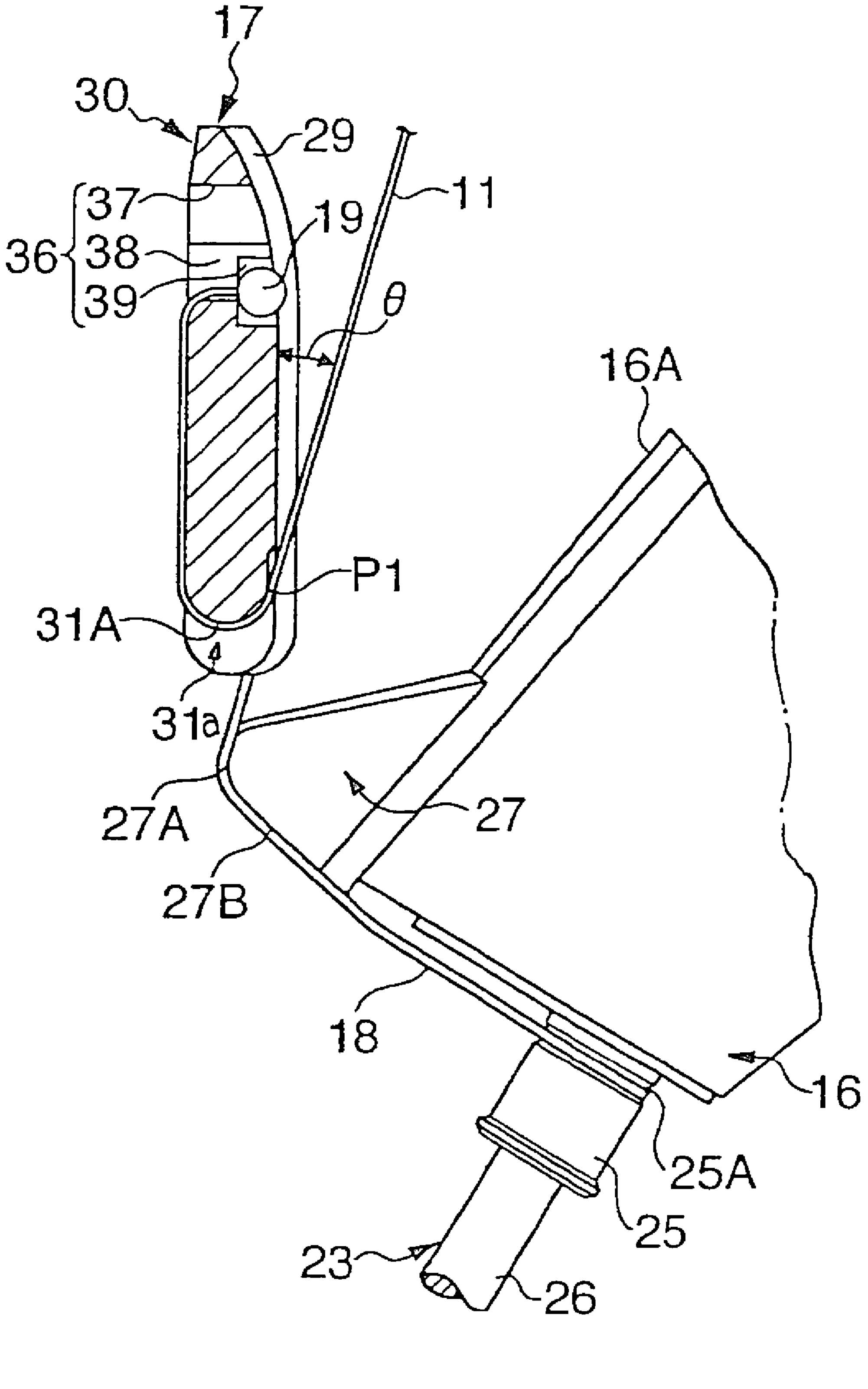
FIG. 8 is a cross sectional view taken along line B—B of FIG. 6 and showing the structure of the tailpiece.
Figure 11:
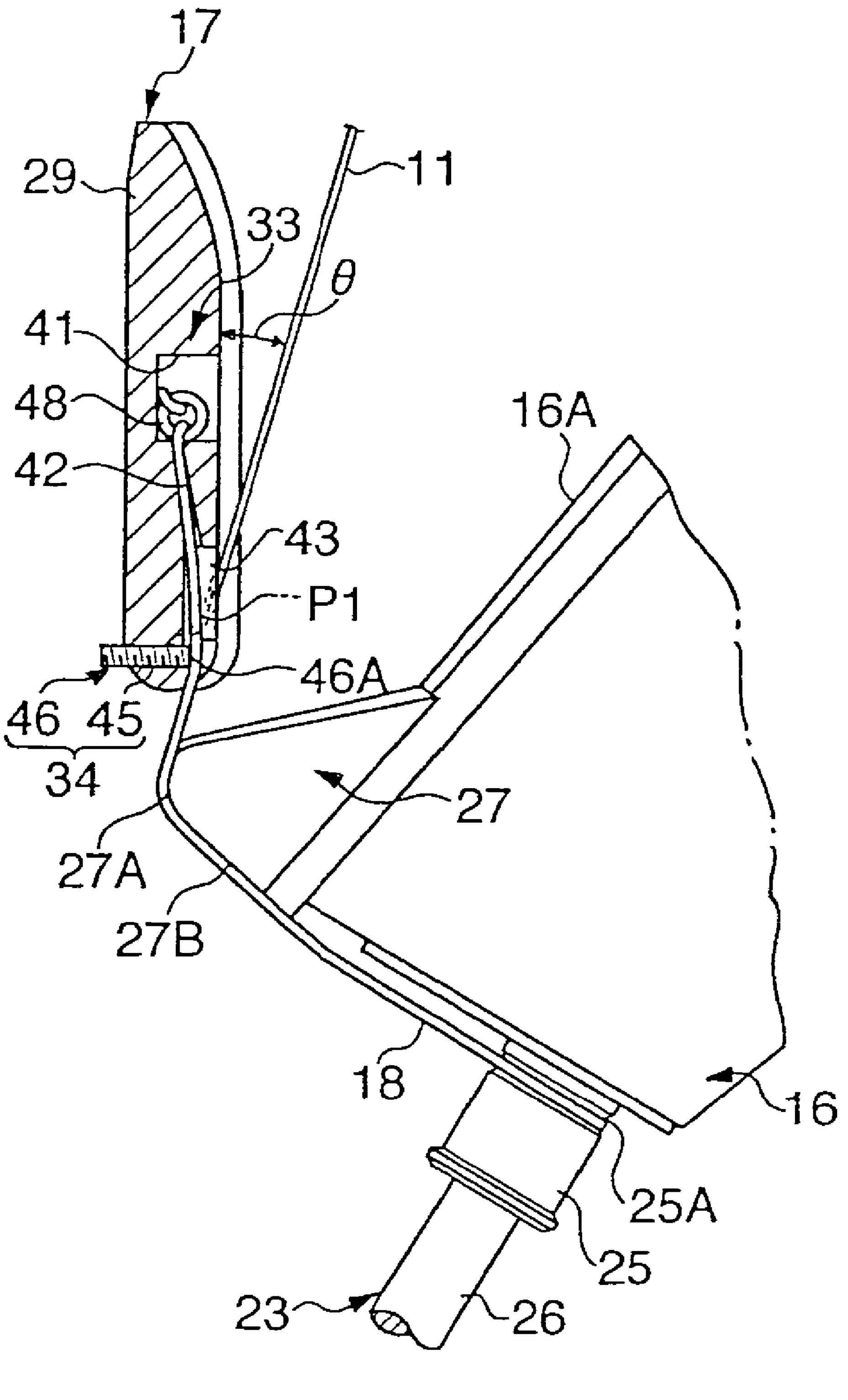
FIG. 11 is a cross sectional view showing an angle regulator incorporated in the tailpiece.

Turning to FIGS. 6, 7 and 8, the strings 11 have respective small disks 19 at the lower ends thereof. The strings 11 are folded at the lower end of the tailpiece 17, and the small disks 19 are engaged with the tailpiece 17.

In detail, the lock unit 25 is formed with a ring-shaped groove 25A, and the saddle 27, which has a prism-like configuration, is secured onto the obverse surface 16A of the body 16. The tailpiece 17 is provided in the space over the saddle 27 as will be better seen in FIG. 8.

A pair of straight grooves 27C is formed in the saddle 27, and extends through the back surface 27B to the ridge 27A of the saddle 27. The ring-shaped groove 25A and straight grooves 27C have the width approximately equal to the thickness of the tail wire 18 so that the tail wire 18 is snugly received in the grooves 25A/27C. The pair of straight grooves 27C prohibit the tail wire 18 from laterally sliding on the saddle 27. The tail wire 18 turns around the lock unit 25, and both end portions reach a middle area of the reverse surface of the tailpiece 17.

The tailpiece 17 is formed from a plate 29, and is broken down into an engaging portion 30, a guide portion 31, an anchoring portion 33 and an angle regulator 34. The small disks 19 are engaged with the engaging portion 30, and keep the strings 11 stretched. Both end portions of the tail wire 18 pass through the straight grooves 27C/27D, respectively, and are anchored at the anchoring portion 30. As a result, the tailpiece 17 is pulled, and is maintained over the body 16. A player changes angle "theta" between the strings 11 and the reverse surface of the tailpiece 17 by means of the angle regulator 34.

Figure 9:
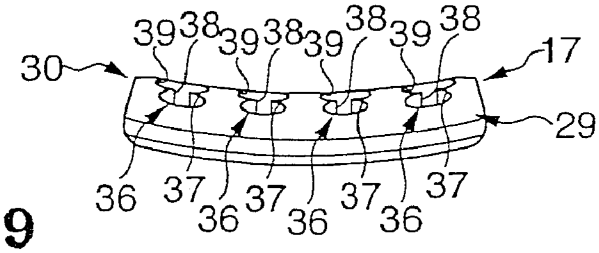
FIG. 9 is a perspective view showing the reverse surface of the tailpiece.
Figure 1:
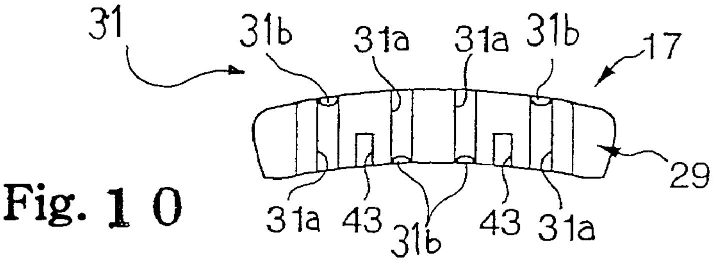

The tailpiece 17 is slightly warped, and is convex over the obverse surface 16A as shown in FIGS. 9 and 10. The engaging portion 30 is implemented by the upper portion of the plate 29 where hollow spaces 36 are formed. The hollow spaces 36 are laterally spaced from one another, and are like a keyhole. Each of the hollow spaces 36 has a circular hole 37, a slit 38 and a circular recess 39. The circular hole 37 are open to the environment on the obverse and reverse surfaces of the tailpiece 17, and the circular recess 39 is open to the environment on the reverse surface. The slit 38 interconnects the circular hole 37 and the circular recess 39. The circular hole 37 is larger in diameter than the small disk 19, and the slit 38 is much smaller than the small disk 19. However, the slit 38 is wider than the associated string 11. When a player engages the string 11 with the engaging portion 30 of the tailpiece 17, the player passes the small disk 19 through the circular hole 37, and moves the small disk 19 from the circular hole 37 into the circular recess 39. The slit 38 permits the string 11 to move to the circular recess 39 together with the small disk 19.

The guide portion 31 is implemented by the lower portion of the plate 29 formed with four notches 31*a*, which are respectively assigned to the strings 11. The notches 31*a* have U-letter shape, and the lower portion has sloped shallow grooves 31*b* toward the notches 31*a*. The U-letter shaped notches 31*a* and sloped shallow grooves 31*b* are wider than the strings 11, and the bottom surfaces 31A of the notches 31*a* are rounded as will be better seen in FIG. 8. By virtue of the sloped shallow grooves 31*b* and rounded bottom surfaces 31A, the strings 11, which extend from the pegs 12A toward the notches 31*a*, are smoothly folded back in the notches 31*a*, and reaches the hollow spaces 36.

The anchoring portion 33 is implemented by a coupler 48 and the middle portion of the tailpiece 17 where a rectangular recess 41, a pair of passages 42 and a pair of shallow grooves 43 are formed. The shallow grooves 43 are formed between the outermost notches 31*a* and the center notches 31*a*, and are open to the environment on the reverse surface of the tailpiece 17. The passages 42 are open at the upper ends thereof to the rectangular recess 41 and at the lower ends thereof to the shallow grooves 43. The rectangular recess 41 is wide enough to receive the coupler 48.

As described hereinbefore, the saddle 27 guides both end portions of the tail wire 18 to the middle portion of the tailpiece 17. Both end portions enter the passages 42 through the shallow grooves 43, and are connected to the coupler 48 received in the rectangular recess 41. The passages 42 do not permit the coupler 48 to pass therethrough, and the coupler 48 keeps both end portions disengaged. Thus, the tail wire 18 keeps the tailpiece 17 stable over the body 16. The tail wire 18 is adjusted to a proper length to permit the tailpiece 17 to be spaced from the saddle 27 on the condition that the strings 11 are stretched.

The angle regulator 34 is implemented by a pair of bolts 46 and a certain portion of the tailpiece 17 where threaded holes 45*b* are formed. The threaded holes 45 penetrate through the certain portion of the tailpiece 17, and are exposed to the shallow grooves 43. The bolts 46 are driven into the threaded holes 45, and the tips 46A of the bolts 46 press the tail wire 18. When a player wishes to vary the angle "theta", he or she drives the bolts 46 into or out of the threaded holes 45. The contact point P1 between the rounded bottom surface 31A and the tail wire 18 is moved along the rounded bottom surface 31A so that the tailpiece 17 rises or lies. Thus, the player can vary the angle "theta" by means of the screws 46. The contact point P1 is usually closer to the bridge 22 than the tips 46A of the bolts 46. When the angle "theta" of the tailpiece 17 is optimized, the small disks 19 are spaced from the strings 11 passing through between the reverse surface of the tailpiece 17 and the obverse surface 16A of the body 16, and the upper end surface of the tail piece is slightly deviated.

The strings 11 are anchored at the tailpiece 17 as follows. The tailpiece 17 has been already connected to the tail wire 18. First, the user inserts the turn-back portion into the ring-shaped groove 25A, and pushes both end portions of the tail wire 18 into the straight grooves 27C, respectively. As a result, the tail wire 18 keeps the tailpiece 17 stable over the obverse surface 16A of the body 16.

Subsequently, the user aligns the small disk 19 of one of the strings 11 with the circular hole 37, and passes the small disk 19 through the circular hole 37. The user moves the small disk 19 to the circular recess 39 through the slit 38, and puts the small disk 19 in the circular recess 39. Thus, the string 11 is anchored at the tailpiece 17.

Subsequently, the user pulls the string 11, and aligns the string 11 with the associated notch 31*a*. The user folds the string 11 onto the reverse surface of the tailpiece 17. The rounded bottom surface 31A permits the string 11 to gently curve thereon, and leaves the tailpiece 17 at point P1. The user makes the string 11 extend through the space between the reverse surface of the tailpiece 17 and the obverse surface of the body 16 toward the peg box 12.

Subsequently, the user anchors the other end of the string 11 at the shaft 12*b*. The user repeats the above-described work for the other strings 11 so that the four strings 11 extend between the tailpiece 17 and the shafts 12*b*.

Finally, the user drives the pegs 12*a* for rotation, and stretches the strings 11 between the tailpiece 17 and the shafts 12*b*. If the user wishes to make the tailpiece 17 rise or lie, he or she drives the bolts 46 so as to adjust the tailpiece 17 to a proper angle.

As will be appreciated from the foregoing description, the tailpiece 17 makes it possible to use the short body 16 for the electric base without sacrifice of the tactual sense at the fingers of the player. The electric base is so compact that the user feels it to easily convey.

Second Embodiment

Figure 12:
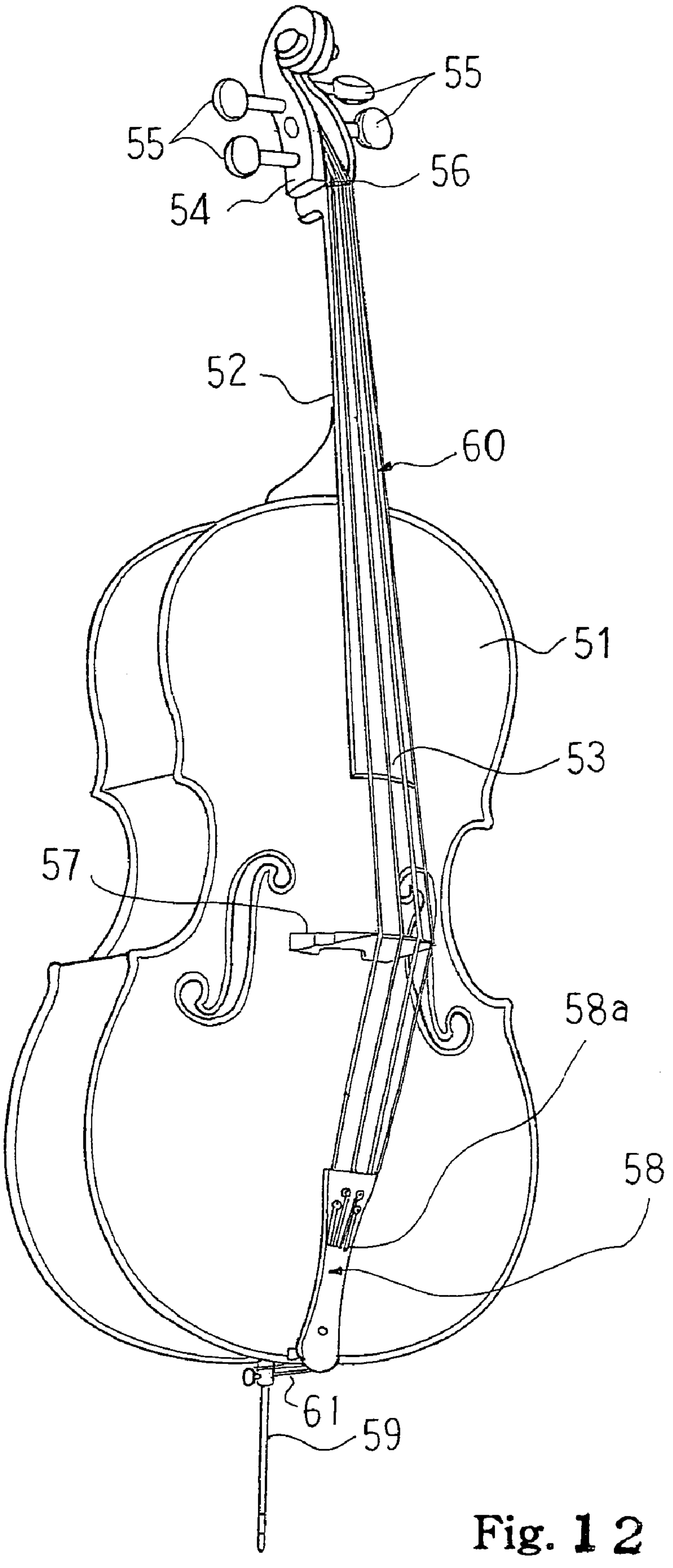
FIG. 12 is a side view showing the structure of an acoustic cello according to the present invention.

Turning to FIG. 12 of the drawings, an acoustic cello embodying the present invention comprises a body 51 with a resonator, a neck 52, a fingerboard 53, a peg box 54, pegs 55, a saddle 56, a bridge 57, a tailpiece 58, an end pin 59 and strings 60. The body 51 is formed by top and opposite boards and ribs so that the resonator is defined inside the body 51. The body 51 is shorter than that of a standard acoustic cello.

The neck 52 projects from the upper end of the body 5, and end pin 59 downwardly projects from the lower end of the body 51. The fingerboard 53 is adhered or secured to the obverse surface of the neck 52, and overhangs the body 51. The saddle 56 is embedded in the upper end of the neck 52, and the bridge 57 is upright on the body 51. The tailpiece 58 is shorter than the tailpiece of a standard acoustic cello. A tail wire 61 keeps the tailpiece 58 over the body 51, and the strings are stretched between the pegs 55 and the tailpiece 58.

The strings 60 pass through the space between the reverse surface of the tailpiece 58 and the body 51, and are folded onto the obverse surface of the tailpiece 58 through holes 58*a*. The strings 60 frontward extend on the obverse surface of the tailpiece 58, and are anchored at the tailpiece 58. For this reason, even though the short body 51 is used, the decorative parts do not reach the bridge 57, and are not bowed by the player. The player feels the bowing as usual. The tailpiece 58 prevents the strings 60 from unintentional lateral motion, and is conducive to good vibrations of the strings 60.

As will be understood, the strings 60 are folded over the tailpiece 58, and makes it possible to use the short body 51.

Although particular embodiments of the present invention have been shown and described, it will be apparent to those skilled in the art that various changes and modifications may be made without departing from the spirit and scope of the present invention.

For example, the angle regulator 34*b* may not be incorporated in a tailpiece according to the present invention.

The electric base and acoustic cello do not set any limit to the technical scope of the present invention. The tailpiece according to the present invention may be used in an electric violin, an acoustic violin, an electric viola, an acoustic viola, an electric cello and an acoustic double bass. Since the tailpieces of the present invention make it possible to employ short bodies in the violins or viola, these stringed instruments are fit to children. The tailpiece according to the present invention may be incorporated in a plucked stringed musical instrument such as, for example a guitar and an electric guitar.

The electric system may electronically produce the electric tones. In this instance, a data processor and a tone generator are incorporated in the electric system. The data processor determines the pitch of tones to be produced on the basis of the vibrations of the strings, and instructs the tone generator to successively read out pieces of waveform data from a waveform memory so as to produce an audio signal.

Although the strings 11/60 are folded over the obverse surfaces of the tailpieces 17/58, the strings 11/60 may extend on the obverse surfaces of other tailpieces, and are folded down onto the reverse surfaces.

The strings 11/60 may be twice or more than twice folded in another tailpiece according to the present invention.

The tail wires 18/61 do not set any limit to the technical scope of the present invention. Yet another tailpiece according to the present invention may be connected to the body by means of a belt or pins.

The end pin 23/59 are not incorporated in the violins and violas, and are not an indispensable element of the stringed musical instrument of the present invention. There is stringed musical instruments, in which the bridge 22/57 is not incorporated. Thus, the bridges 22/57 are not an indispensable element.

The component parts and portions of the component parts are correlated with "claim languages" as follows. The upper end and lower end are corresponding to "one end" and "another end", respectively. The peg box 12, pegs 12*a*, shafts 12*b* and nut 14 or the peg box 54 and pegs 55 as a whole constitute a "tension controlling unit". The neck 13 and fingerboard 13A or the neck 52 and fingerboard 53 form in combination a "pitch controlling member". The parts of the strings 11/60 on which the colored yarns are wound are corresponding to "improper portions for vibrations". The obverse surface and reverse surface are corresponding to "two major surfaces" of the tailpiece. The notches 31*a* or holes 58*a* are equivalent to "paths".

What is claimed is:

1. A stringed musical instrument for producing tones, comprising:

a body having one end portion and another end portion;

a pitch controlling member having a longitudinal direction, and projecting from said one end portion in said longitudinal direction;

a tension controlling unit secured to said pitch controlling member;

a tailpiece connected to said another end portion;

a bridge upright on said body between said pitch controlling member and said tailpiece; and strings stretched in said longitudinal direction between said tension controlling unit and said tailpiece, having improper portions for vibrations between said tailpiece and said bridge, and folded in said tailpiece.

2. The stringed musical instrument as set forth in claim 1, in which said tail-piece is formed with paths connecting two major surfaces thereof to each other so that said strings are folded through said paths.

3. The stringed musical instrument as set forth in claim 2, in which said strings extend on one of said two major surfaces, pass through said paths, and extend on the other of said two major surface oppositely to those on said one of said two major surfaces.

4. The stringed musical instrument as set forth in claim 1, in which said tailpiece has an engaging portion, and said strings are anchored at said engaging portion.

5. The stringed musical instrument as set forth in claim 4, in which said engaging portion is formed with hollow spaces where end portions of said strings are inserted so as to be anchored thereat.

6. The stringed musical instrument as set forth in claim 1, further comprising an electric system for producing electric tones on the basis of the vibrations of said strings.

7. The stringed musical instrument as set forth in claim 6, in which said electric system includes a pickup unit for converting said vibrations to an electric signal expressing said vibrations of said strings, and said electric tones are produced from said electric signal.

8. The stringed musical instrument as set forth in claim 7, in which said pickup unit is embedded in a bridge upright on said body between said pitch controlling member and said tailpiece.

9. The stringed musical instrument as set forth in claim 8, in which said bridge is provided between said pitch controlling member and said tailpiece formed with paths connecting two major surfaces thereof to each other, and strings extend over said bridge to said paths so as to be folded through said paths.

10. The stringed musical instrument as set forth in claim 9, in which said strings extend on one of said two major surfaces, pass through said paths, and extend on the other of said two major surface oppositely to those on said one of said two major surfaces.

11. The stringed musical instrument as set forth in claim 10, further comprising an end pin projectable from said another end of said body, wherein said tailpiece is anchored at said end pin by means of a tail wire.

12. The stringed musical instrument as set forth in claim 11, further comprising a saddle secured to said body in the vicinity of said another end portion and formed with grooves, wherein said tail wire is received in said grooves so as to be guided to said tailpiece.

13. The stringed musical instrument as set forth in claim 1, in which said body is formed with a resonating chamber so that vibration energy of said strings is enlarged in said resonating chamber.

14. The stringed musical instrument as set forth in claim 13, further comprising a bridge upright on said body between said pitch controlling member and said tailpiece and an end pin projectable from said another end portion of said body so as to keep said body over a floor, wherein said tailpiece is anchored at said end pin by means of a tail wire.

15. A stringed musical instrument for producing tones, comprising:

a body having one end portion and another end portion;

a pitch controlling member having a longitudinal direction, and projecting from said one end portion in said longitudinal direction;

a tension controlling unit secured to said pitch controlling member;

a tailpiece connected to said another end portion;

strings stretched in said longitudinal direction between said tension controlling unit and said tailpiece, and folded in said tailpiece; and a tail wire anchoring said tailpiece at said another end portion.

16. The stringed musical instrument as set forth in claim 15, further comprising an angle controller for changing an angle between said tailpiece and said strings.

17. The stringed musical instrument as set forth in claim 15, further comprising an end pin projectable from said another end of said body so as to keep said body over a floor, wherein said tail wire is engaged with said end pin.

18. The stringed musical instrument as set forth in claim 16, further comprising a saddle secured to said body in the vicinity of said another end and formed with grooves for guiding said tail wire to said tailpiece held in a space over said body.

19. The stringed musical instrument as set forth in claim 18, further comprising an end pin projectable from said another end of said body so as to keep said body over a floor, wherein said tail wire is engaged with said end pin.

* * * * *